US010321379B2

(12) United States Patent
Ge

(10) Patent No.: US 10,321,379 B2
(45) Date of Patent: Jun. 11, 2019

(54) METHOD AND APPARATUS FOR REDUCING THE LENGTH OF A PACKET STORM IN A WIRELESS MESH NETWORK

(71) Applicant: SIGNIFY HOLDING B.V., Eindhoven (NL)

(72) Inventor: Xiaodong Ge, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 24 days.

(21) Appl. No.: 15/304,031

(22) PCT Filed: Apr. 2, 2015

(86) PCT No.: PCT/EP2015/057402
§ 371 (c)(1),
(2) Date: Oct. 13, 2016

(87) PCT Pub. No.: WO2015/158562
PCT Pub. Date: Oct. 22, 2015

(65) Prior Publication Data
US 2017/0034760 A1  Feb. 2, 2017

(30) Foreign Application Priority Data

Apr. 16, 2014 (WO) ................ PCT/CN2014/000416
May 26, 2014 (EP) ..................................... 14169821

(51) Int. Cl.
*H04B 7/00* (2006.01)
*H04W 40/02* (2009.01)
(Continued)

(52) U.S. Cl.
CPC ............. *H04W 40/02* (2013.01); *H04L 45/02* (2013.01); *H04L 45/025* (2013.01); *H04W 40/023* (2013.01); *H04W 84/18* (2013.01)

(58) Field of Classification Search
CPC ..... H04W 4/06; H04W 40/24; H04W 40/242; H04W 72/12; H04W 72/1221
(Continued)

(56) References Cited

U.S. PATENT DOCUMENTS 5,097,469 A   3/1992  Douglas
7,554,941 B2  6/2009  Ratiu et al.
(Continued)

FOREIGN PATENT DOCUMENTS

EP       2416513 A1    2/2012
KR    20040078549 A    9/2004
(Continued)

OTHER PUBLICATIONS http://www.zigbee.org/Standards/Downloads.aspx, Zigbee Specification, 053474r17, Jan. 17, 2008.
(Continued)

*Primary Examiner* — Dmitry Levitan

(57) ABSTRACT

A broadcast transmission will generate a packet storm in a mesh network, which will last for a very long time and block the network for other traffic. There is a parameter in a broadcast control mechanism named radius which controls the duration of the packet storm. The invention proposes to dynamically select the smallest radius to reduce the packet storm to a minimum, by reporting the smallest possible radius parameter for the broadcast control mechanism. Each device or node of the network comprises a neighbor table for tracking which of its neighboring devices or nodes has successfully relayed the broadcast transmission. Additionally, each device or node comprises a broadcast transaction table to keep a record of any new broadcast transmission or transaction that is either initiated locally or received from a neighboring device or node. Each broadcast transmission comprises a so called radius parameter R which indicates an (Continued)

allowed number of hops through the mesh network before the broadcast transmission is discarded. The mechanism to report broadcast status may be realized in an exemplary embodiment of the invention by adding two new tables to track broadcasting status from neighboring devices: the child table, to which the concerned network node or network device has transmitted or relayed a broadcast transmission, and the broadcast listening table; and by adding three fields into the broadcast transaction table: the radius, report interval and report timeout; and also by adding two new parameters into broadcast message itself: report interval and report timeout.

12 Claims, 5 Drawing Sheets

(51) Int. Cl.
*H04L 12/751* (2013.01)
*H04W 84/18* (2009.01)

(58) Field of Classification Search
USPC .................. 370/310, 312, 389, 390, 400
See application file for complete search history.

(56) References Cited

U.S. PATENT DOCUMENTS

| | | | | | |
|---|---|---|---|---|---|
| 7,653,010 | B2* | 1/2010 | Ensor | ................ | H04L 29/12207 370/255 |
| 7,826,398 | B2 | 11/2010 | Monier | | |
| 8,027,262 | B2* | 9/2011 | Kawarai | ............. | H04L 12/4641 370/241 |
| 8,300,551 | B2* | 10/2012 | Koop | ................... | H04L 45/122 370/229 |
| 8,570,190 | B2* | 10/2013 | Marinakis | ............ | H05B 37/034 340/915 |
| 2004/0174844 | A1 | 9/2004 | Cho et al. | | |
| 2008/0219151 | A1 | 9/2008 | Ma et al. | | |
| 2008/0247408 | A1 | 10/2008 | Yoon et al. | | |
| 2010/0157888 | A1 | 6/2010 | Aggarwal et al. | | |
| 2011/0194558 | A1 | 8/2011 | Sinha et al. | | |

FOREIGN PATENT DOCUMENTS

| | | |
|---|---|---|
| WO | 2009147585 A1 | 12/2009 |
| WO | 2011083389 A1 | 7/2011 |
| WO | 2011145027 A1 | 11/2011 |

OTHER PUBLICATIONS http://www.ics.uci.edu/~gts/paps/hotv99.ps.gz, Flooding for reliable multicast in multi-hop ad hoc networks, 1999.

http://astro.temple.edu/~tua83741/jiewu/publications/2002/3.pdf, On Reducing Broadcast Redundancy in Ad Hoc Wireless Networks, 2002.

http://ftaiani.ouvaton.org/ressources/pampa-future.pdf, Tailoring a broadcast algorithm to particular network conditions, 2008.

http://people.cs.nctu.edu.tw/~yctseng/papers.pub/mobile20-storm.ps, Adaptive Approaches to Relieving Broadcast Storms in a Wireless Multihop Mobile Ad Hoc Network, 2003.

http://www.cs.rice.edu/~lt7/publications/ADB.pdf, ADB: An Efficient Multihop Broadcast Protocol based on Asynchronous Dutycycling in Wireless Sensor Networks, 2009.

http://eexplore.ieee.org/xpl/freeabs_all.jsp?arnumber=4022363 &abstractAccess=no&userType=inst, Efficient Lightweight Broadcasting Protocols for Multi-Hop Ad Hoc Networks, 2006.

http://www.s2is.org/Issues/v3/n3/papers/paper11.pdf, Reliable Data Broadcast for ZigBee Wireless Sensor Networks, 2010.

\* cited by examiner

| FN | FT | VR |
|---|---|---|
| Ext-Addr | Int | 64-bit, IEEE |
| Net-Addr | NA | 0x0000-0xffff |
| DT | Int | 0x00-0x02 |
| RxOnWhenIdle | BI | 0/1 |
| Rel | Int | 0x00-0x05 |
| Tx-F | Int | 0x00-0xff |
| LQI | Int | 0x00-0xff |
| OC | Int | 0x00-0xff |
| A | Int | 0x00-0xff |
| IB-ts | Int | 0x000000-0xffffff |
| BTx-to | Int | 0x000000-0xffffff |

FIG. 2

| FN | S[b] | DESC |
|---|---|---|
| S-Addr | 2 | |
| SN | 1 | |
| ET | 1 | |
| R | Int | 0x00-0xff |
| RP-int | Int | 0x00-0xff |
| RP-to | Int | 0x00-0xff |

FIG. 3

| H | R | RP-int | RP-to | PL | CHS |
|---|---|---|---|---|---|

FIG. 4

| H | Rmax | D-Addr_1 | ... | D-Addr_n | M-ID |
|---|---|---|---|---|---|

FIG. 5

METHOD AND APPARATUS FOR REDUCING THE LENGTH OF A PACKET STORM IN A WIRELESS MESH NETWORK

CROSS-REFERENCE TO PRIOR APPLICATIONS

This application is the U.S. National Phase application under 35 U.S.C. § 371 of International Application No. PCT/EP2015/057402, filed on Apr. 2, 2015, which claims the benefit of Chinese Patent Application No. PCT/CN2014/000416, filed on Apr. 16, 2014 and European Patent Application No. 14169821.7, filed on May 26, 2014. These applications are hereby incorporated by reference herein.

FIELD OF THE INVENTION

The invention relates to the field of apparatuses and methods for controlling broadcast transmission in a wireless mesh network, such as but not limited to meshed networks of wirelessly interconnected lighting devices.

BACKGROUND OF THE INVENTION

Meshed networks of wirelessly interconnected lighting poles or other lighting devices, sensor devices, or load devices will become the infra-structure for smart city or housing services such a light management, traffic management, and air quality monitoring. City wide networks may consist of tens of thousands of lighting poles that relay traffic via multi-hop communication protocols. The size of these networks makes their deployment an undertaking which challenges the current state of the art in network design and networking protocols.

Similarly wirelessly connected lighting networks will provide easy to install and energy efficient lighting within professional and residential buildings. Additional benefits of such lighting networks are in lighting management and data-based services. Data must be routed along multi-hop paths between nodes in the lighting poles and the coordinator node. As the networking nodes are resource (memory) constrained, routing protocols based on flooding are needed.

In professional wireless lighting applications, it is a common usage for one controller to send one command to a large amount of destination devices in a wireless mesh network, such as ZigBee network, so that all devices are reacting at the same time, e.g., to switch on or off all lights. A mesh network broadcast algorithm, e.g., the ZigBee data broadcast function, is used to send the message from the controller to all other devices in the network, which may be located far from each other and rely on forwarding to pass data from one device to the other (multi-hopping). The broadcast algorithm is based on a network flooding mechanism to send one packet repeatedly to all devices, and each device will forward the received packet and re-broadcast it to others so that in the end all devices in the network will receive the packet at least once, no matter how far away the device is located in the mesh network.

In a mesh network, two network functions are depending on the broadcast algorithm: route discovery and data broadcast. The broadcast transmission will flood the network with many packets, the packet storm, for a long duration. The flooding will thus generate a storm of packets in the network in the hope to cover as much devices as possible, and, as a side effect, during the packet storm, other commands sent to the network may be stalled, since the packet storm may occupy a large portion or most of the available network bandwidth. A mechanism to control the duration can be implemented to limit the time of the storm lasting in the network, thus a balance of quality and efficiency is achieved. More specifically, the broadcast algorithm may use the broadcast radius to control the duration. Each packet may carry a radius parameter and reduce it by one when being forwarded. Thus, a broadcast packet storm will die out when the last packet floating in the network has a value of one for the radius parameter. Usually a default large value is chosen for the radius hoping to cover most different network layouts. When a network has a layout with long path (high number of hops) between two nodes, a large value of the radius parameter is needed to cover the whole network. When the path is short, a small value of the radius parameter can sufficiently reach all nodes, but remove the redundant packets.

For any given network layout, a smallest possible radius parameter is needed, which will sufficiently ensure the broadcast coverage, and at the same time use efficiently the available network bandwidth, that is, to reduce the packet storm duration as short as possible. Thus this radius parameter must be calculated for a given network layout, instead of using a fixed default value. Besides, the network operation conditions may change overtime, for example, with external environment changes, such as adding new radio frequency (RF) interference sources, the radius parameter needs to be calibrated over time. An option to find out the best value for the radius parameter is to try the broadcast transmission with different values of the radius parameter, and compare the results of the broadcast so as to choose the smallest and with sufficient reliability. The broadcast result has two aspects: coverage and duration. The broadcast coverage is the status of all devices whether the broadcast message is received or not, the broadcast duration is the time between the first packet and the last packet in circulation. The difficulty lies in the mechanism of broadcast coverage calculation, e.g., how to return the status of all devices (received or missing) to the broadcast message initiator.

Because the above broadcast control is implemented, and with issues like the network bandwidth limitation, wireless interference, from network itself or other sources, or packet collisions etc., some devices may still not receive the broadcasted message. While many studies have been conducted on improvements of a broadcast algorithm itself, either on coverage or on efficient network bandwidth usage, few studies are related to detecting and reporting the missing devices after the broadcast. The reporting mechanism is important for mission critical applications, for example, a "switch all lights off" command issued to the mesh network, all lights shall be switched off, and the operator shall be notified if there are any lights not receiving the commands, and a remedy can be immediately followed, otherwise, without this mechanism, the operator may leave few lights on unnoticed.

SUMMARY OF THE INVENTION

It is an object of the present invention to provide a broadcast control mechanism by means of which to the length of a packet storm in a wireless mesh network can be reduced while still ensuring sufficient network coverage by broadcast transmissions.

This object is achieved by an apparatus as claimed in claims 1 and 11, by a network node comprising such apparatuses, by a method as claimed in claim 11 and 12, and by a computer program product comprising code means for producing the steps of these methods when run on a computer device.

Accordingly, an efficient approach is provided to report the status of all devices in the network with the re-broadcasting from their neighboring devices, back to the original broadcast message initiator. Thereby, the broadcast initiator can have knowledge on which devices in the network are not re-broadcasting, which is a possible indication that those devices are not receiving any of the broadcast messages relayed from other devices. After the initiator obtained the report on missing devices, the initiator may take further action to remedy the situation, such as re-broadcast the message again, or re-send the message directly to those devices.

Furthermore, the maximum repetition number which was necessary for a broadcast storm to reach every node in the network can be fed back. This maximum repetition number can be used to adjust or reduce the value of the maximum hop count (or radius parameter) in a subsequent broadcast message so that the duration of the broadcast storm is reduced (if appropriate). A new parameter is thus introduced into the status report message, which indicates the maximum repetition number in the received broadcast messages for all the devices in the report.

The mechanism to report the broadcast status may be realized in an exemplary embodiment of the invention by adding two new tables to track broadcasting status from neighboring devices: the child table and the broadcast listening table; and by adding three fields into the broadcast transaction table: the radius, report interval and report timeout; and also by adding two new parameters into broadcast message itself: report interval and report timeout.

Here, the term "neighbor" is used to designate any network device or network node that is located within a transmission and/or reception range of a concerned device or node. Furthermore, the term "child" is used for any network device or network node to which the concerned network node or network device has transmitted or relayed a broadcast transmission.

According to a first option, the radius parameter of a new broadcast transmission may be compared with a previous one when updating an existing entry in the broadcast transaction table, and the smaller one may be recorded in the broadcast transaction table. Thereby, it can be ensured that each entry in the broadcast transaction table is always updated to the smallest value of the radius parameter, then when the message is sent out again, the radius will be reduced by one, and thus the broadcast storm will gradually die out in the network.

According to a second option, which can be combined with the first option, a report interval provided for each recorded broadcast message of the broadcast transaction table may be checked and, when the report interval has been reached, the same broadcast message may be searched in the broadcast listening table, and then all child devices having received the same broadcast message may be flagged or marked so at to form a status report message. It can thus be ensured that, at the end of the report interval, a reporting feedback about those devices having received the broadcast message can be provided to a broadcast initiator device. This method allows a broadcast initiator to monitor the broadcast progress by retrieving the broadcast status periodically in the middle of the broadcast storm, which may last very long.

According to a third option which can be combined with the first or second option, a report timeout provided for each recorded broadcast message of the broadcast transaction table may be checked and, when the report timeout has been reached, the same broadcast message may be searched in the broadcast listening table, and all child devices having received the same broadcast message may then be flagged or marked so at to form a status report message. It can thus be ensured that, after expiry of the report timeout, a reporting feedback about those devices having received the broadcast message can be provided to the broadcast initiator device. Thus, a broadcast initiator may setup an expiring timer for the broadcast status report, since the duration of broadcast storm is uncertain under all circumstances, but, e.g., the user interface feedback may need a timely update.

According to a fourth option which can be combined with any one of the above first to third options, a new broadcast transmission may be initiated if after the timeout any of the devices listed in the neighbor table has not relayed the new broadcast transmission.

According to a fifth option which can be combined with any one of the above first to fourth options, a message with the shortest radius parameter may be searched in the broadcast transaction table if a status report message is generated, a sending address of the message with the shortest radius parameter may be extracted, and the status report message may be send to the extracted sending address using a unicast transmission. This ensures the report is generated backwards from the broadcast storm, i.e., the reports are delivered from the end to the beginning of the path when broadcast messages are delivered.

According to a sixth option which can be combined with any one of the above first to fifth options, if a status report message has been received, the same message with the shortest radius parameter is searched in the broadcast transaction table if there is a child device having the same message, and a device address of the message with the shortest radius parameter is extracted for report forwarding, or the status report message is discarded if there is no such message in the broadcast transaction table. This measure ensures that status report messages are only forwarded to devices with shortest radius parameter values.

According to a seventh option which can be combined with any one of the above first to sixth options, all values of the radius parameter in the broadcast listening table for all devices having received the same broadcast message may be compared and the largest radius parameter may inserted in a status report message. The report will carry the information what is the number of hops necessary to reach those devices. Thereby, the broadcast radius parameter can be calibrated at the broadcast initiator to achieve sufficient network coverage by the packet storm.

According to an eighth option which can be combined with any one of the above first to seventh options, a re-calibration may be initiated if it is determined that a device of the wireless mesh network is not able to receive a broadcast transmission or that the number of devices not able to receive the broadcast transmission decreases, wherein the re-calibration is started by selecting an initial value for the radius parameter that is larger than a current value and smaller than a default value. Thus, the broadcast initiator is able to continuously adjust the broadcast radius to changed environmental conditions.

It is noted that the above apparatus may be implemented based on discrete hardware circuitry with discrete hardware components, an integrated chip, or an arrangement of chip modules, or based on a signal processing device or chip controlled by a software routine or program stored in a memory, written on a computer readable medium, or downloaded from a network, such as the Internet.

It shall be understood that the apparatus of claims 1 and 7, the network node of claim 8, the mesh network of claim 9, the method of claim 11, and the computer program product of claim 12 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 2 shows a neighbor table entry format which can be used in the present invention;

FIG. 3 shows an improved broadcast transaction record according to various embodiments;

FIG. 4 shows an improved broadcast message format according to various embodiments;

FIG. 5 shows an improved broadcast status reporting message format according to various embodiments;

DETAILED DESCRIPTION OF EMBODIMENTS

Figure 1:
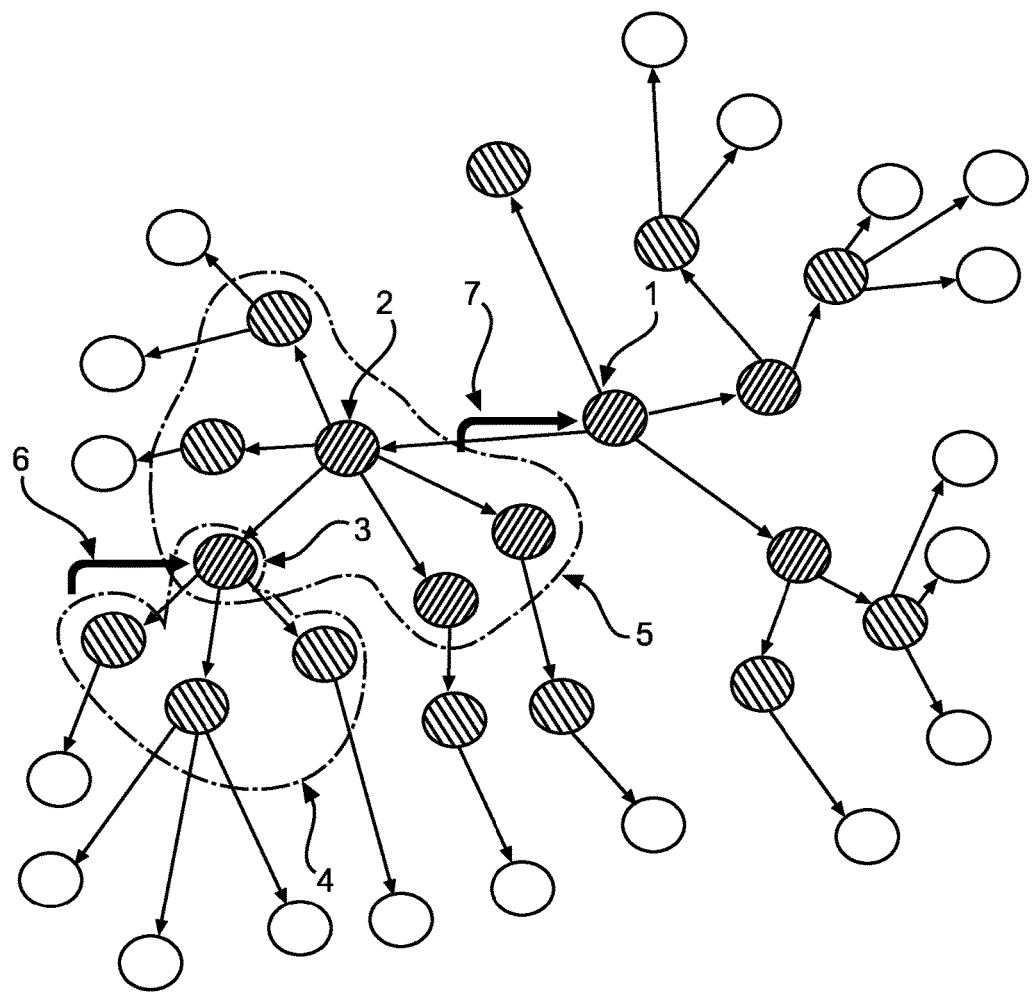
FIG. 1 shows a schematic architecture of a wireless mesh network with a reporting path for a broadcast message according to various embodiments.

Embodiments of the present invention are now described based on a broadcast control system which can be used to control the length of a packet storm in a wireless mesh network, such as wireless lighting network. The mesh network is typically configured in a cluster tree topology and comprises a plurality of devices or nodes which can initiate or forward a broadcast transmission (e.g., broadcast message, broadcast status reporting message, etc.). Each device or node of the network comprises a neighbor table for tracking which of its neighboring devices or nodes has successfully relayed the broadcast transmission. Additionally, each device or node comprises a broadcast transaction table to keep a record of any new broadcast transmission or transaction that is either initiated locally or received from a neighboring device or node. Each broadcast transmission comprises a so-called radius parameter R which indicates an allowed number of hops through the mesh network before the broadcast transmission is discarded.

According to a conventional passive acknowledgement mechanism (e.g. ZigBee broadcast algorithm), a device prepares the content of the neighbor table for recording information about its neighboring devices before initiating a broadcast transmission. A broadcast transmission can be initiated by any device in the network and has a radius parameter R with an initial value larger than 0. According to ZigBee specifications, the broadcast transmissions shall not use a sub-layer acknowledgement of the Medium Access Control (MAC) protocol layer. When a device receives a valid broadcast frame from a neighboring device, it shall update the broadcast transaction table, i.e., add an entry if it is new or drop the message if it is not new. If the received broadcast message is new in the broadcast transaction table, this message will be processed and retransmitted if the radius parameter R of the message is not zero, and the radius parameter will be reduced by 1 in the retransmitted broadcast message. After a timeout, if any of the devices in the neighbor table has not relayed the newly broadcasted message, then the device shall retransmit the message few times. The broadcast message from a device will thus trigger a packet storm through the mesh network according to the above rules, wherein the storm will die out when the radius of the last broadcast message is reaching zero.

However, the above rules will not guarantee that all devices in the network will receive the broadcast message at least once. The devices only do their best to send as many broadcast messages as possible for a given number of network hops, as limited by the initial value of the radius parameter R. Therefore, the broadcast initiator does not know which devices are not covered by the relaying (or rebroadcasting).

According to various embodiments, an efficient broadcast control mechanism is provided to report the status of all the devices in the network with the re-broadcasting from their neighboring devices, back to the original broadcast initiator. Thereby, the broadcast initiator will have the knowledge about those network devices which are not rebroadcasting, which is a possible indication that those devices are not receiving any of the broadcast messages relayed from other devices. After the broadcast initiator obtained the report on missing devices, the initiator may take further action to remedy the situation, such as re-broadcast the message again, or re-send the message directly to those devices.

To achieve this, an additional child table is provide in the device, for tracking which of its child devices has successfully relayed the broadcast transmission. Additionally, a broadcast listening table is provided in the device, to keep a record of any new broadcast transaction that has been received from a child device. Furthermore, the radius parameter of received messages is added as an additional value to each broadcast transaction record in the broadcast transaction table. Moreover, report interval and report timeout are introduced as two new parameters embedded into the broadcast message and the broadcast transaction record shall also add two fields for these two new parameters.

Thus, there are two new tables for monitoring child devices, three additional fields in the broadcast transaction record for remembering the radius of a received message, and two new parameters embedded in the broadcast message. In the following, the functionality and usage of these new tables, fields and parameters are described based on embodiments of the present invention.

FIG. 1 shows a schematic architecture of a wireless mesh network with a proposed reporting path for a broadcast message. A new broadcast message is forwarded by a first forwarding device or broadcast initiator 1. A second forwarding device 2 relays the broadcast message to its child devices (indicted by a first encircled group 5). Then, a third forwarding device 3, which is one of the above child devices again relays the broadcast message to its child devices (i.e. children's children indicates by a second encircled group 4). A first consolidated report 6 of a device and all of its children is provided from the second encircled group 4 to the third forwarding device 3. Furthermore, a second consolidated report 7 of a device and all of its children and all of the children's children is provided from the first encircled group 5 to the broadcast initiator 1. The first consolidated report 6 and the second consolidated report 7 are delivered to the respective parent devices 3 and 1 in one message.

FIG. 2 shows an example of a ZigBee neighbor table entry format, which includes a first field with a field name (FN) "Extended address" (Ext-Addr) of an integer (Int) field type (FT) with a valid range (VR) of a 64-bit IEEE address. A second field is named "Network address" (Net-Addr) and has field type of a network address (NA) and a valid range (VR) from "0x0000" to "0xffff". A third field is named "Device type" (DT) and has field type of an integer (Int) and a valid range (VR) from "0x00" to "0x02". A fourth field is named "RxOnWhenIdle" and has field type (FT) of a Boolean (BI) and a valid range (VR) of "0" to "1" indicating the reception status in an idle mode. A fifth field is named "Relationship" (Rel) and has field type (FT) of an integer (Int) and a valid range (VR) of "0x00" to "0x05". A sixth field is named "Transmit Failure" (Tx-F) and has field type (FT) of an integer (Int) and a valid range (VR) of "0x00" to "0xff". A seventh field is named "LQI" and has field type (FT) of an integer (Int) and a valid range (VR) of "0x00" to "0xff". An eighth field is named "Outgoing Cost" (OC) and has field type (FT) of an integer (Int) and a valid range (VR) of "0x00" to "0xff". A ninth field is named "Age" (A) and has field type (FT) of an integer (Int) and a valid range (VR) of "0x00" to "0xff". A tenth field is named "Incoming beacon timestamp" (IB-ts) and has field type (FT) of an integer (Int) and a valid range (VR) of "0x000000" to "0xffffff". Finally, an eleventh filed is named "Beacon transmission time offset" and has field type (FT) of an integer (Int) and a valid range (VR) of "0x000000" to "0xffffff". Further details on meaning and function of the above fields can be gathered from the ZigBee specification 053474r17, Jan. 17, 2008.

FIG. 3 shows a table with an improved broadcast transaction record of the broadcast transaction table according to various embodiments. In addition to conventional fields "Source Address" (S-Addr, which is a 16-bit network address of the broadcast initiator with a size (S) of 2 bytes), "Sequence number" (SN, which is a network layer sequence number of the initiator's broadcast message with a size (S) of 1 byte), and "Expiration Time" (ET, which corresponds to the value of a countdown timer indicating the number of seconds until this entry expires and has a size (S) of 1 byte), three new fields "Radius" (R), "Report interval" (RP-int or how often the periodical report is generated), and "Report timeout" (RP-to or when is the latest report generated), are introduced, which are all of integer type and range "0x00" to "0xff".

FIG. 4 shows an improved format of the broadcast message according to various embodiments, to which the above three additional fields have also been added. Additionally, the broadcast message includes conventional fields such as a header (H) for address and/or control information, a payload (P) for user information, and a checksum (CHS) for error correction purposes.

FIG. 5 shows the format of a proposed status reporting message according to various embodiments, to which a parameter field Rmax has been added, which indicates the maximum repetition number value in the received broadcast messages for all devices in the status report. This value can be for example deduced from the radius parameter values recorded in the broadcast transaction table. Since the radius parameter is decremented at each hop, the number of repetition can be deduced from it. Alternatively, the report of FIG. 5 includes the smallest value of the radius parameter. Then, the message initiator, when receiving the report, deduces from the smallest radius parameter what is the corresponding maximum repetition number.

Additionally, the status reporting message includes fields such as a header (H) for address and/or control information, device addresses (D-Addr_1 to D-Addr_n) for address information of the devices of the status report, and a message identity (M-ID) for message identification purposes.

Figure 6:
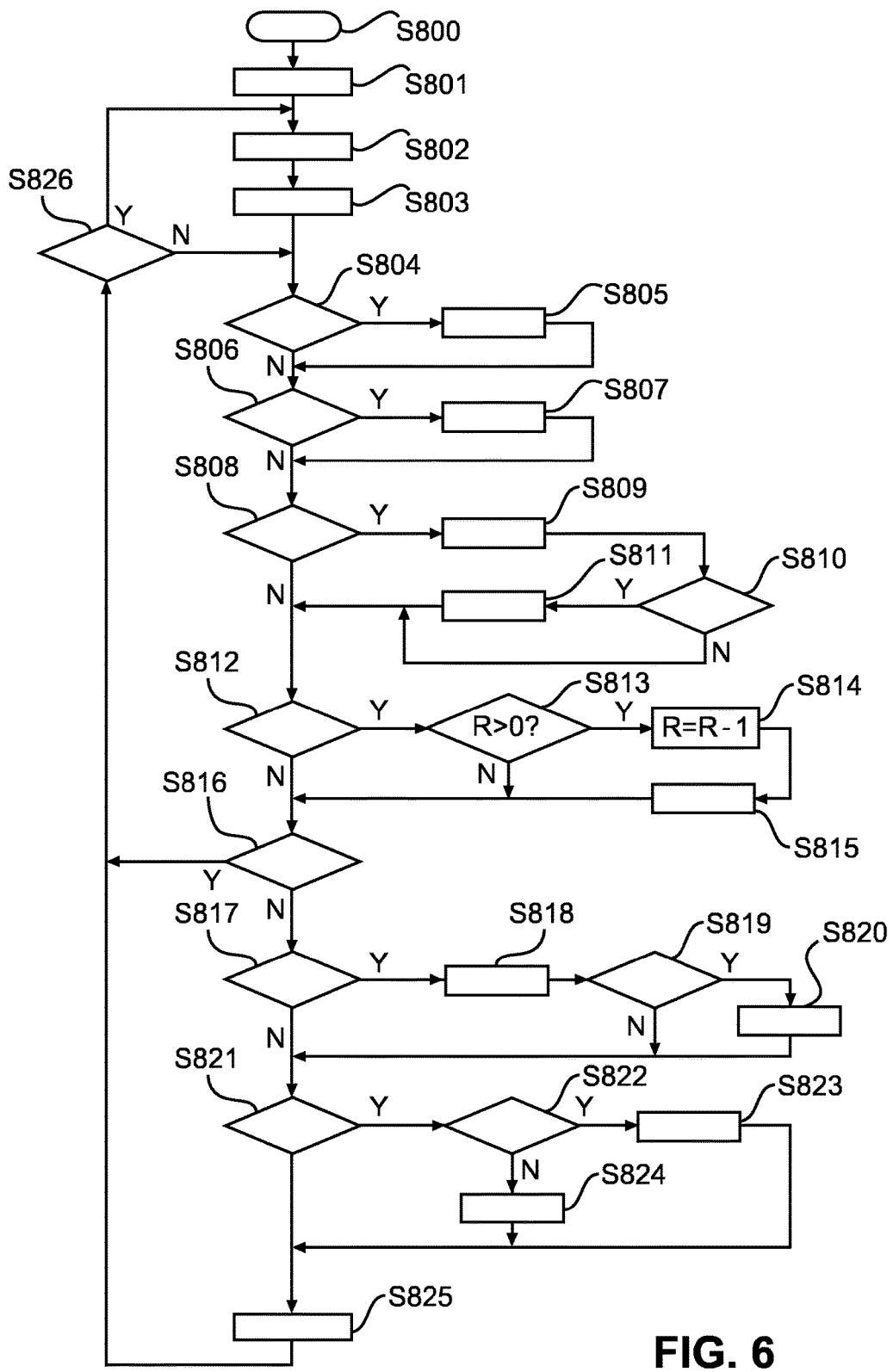
FIG. 6 shows a flow diagram of a broadcast controlling procedure according to a first embodiment.

FIG. 6 shows a flow diagram of a broadcast controlling procedure according to a first embodiment, where a status reporting message is generated.

The procedure starts in step S800 and a broadcast initiator device prepares the content of the neighbor table for recording information about its neighboring devices before the broadcast and the content of the child table for recording information about its children devices before the broadcast (step S801). Then, in step S802, a broadcast transmission is initiated, wherein the initial value of the radius parameter of the broadcast message is set to a value larger than 0. The broadcast transmission is configured not to use the MAC sub-layer acknowledgement. In step S803, the broadcast transaction table is updated to keep a record of the new broadcast transmission. Additionally, the broadcast listening table is used to keep a record of any broadcast transaction that is received from a child device.

Now, the procedure checks in step S804 whether any valid broadcast transmission (e.g. broadcast frame) has been received from a neighboring device. If so, the broadcast transaction table is again updated in step S805 by adding an entry if the received message is new. If the received message is not new, the received message is dropped in step S805. When an existing entry is updated in the broadcast transaction table, the radius parameter R of the new message is compared with the previous one listed in the broadcast transaction table and the smaller value of the radius parameter R is recorded.

Additionally, if the broadcast message has been received from a child device, the broadcast listening table is also updated in step S805 and a new entry is added if the received message is new.

Then, in step S806, for each of the recorded messages in the broadcast transaction table, the report interval parameter is checked. Once it is reached, the broadcast listening table is searched in step S807 for the same broadcast message, and all child devices which have received the message are flagged to form a report message. If the report interval is zero, there will be no periodical report message generated.

If the report interval is not reached or no periodical report is requested by the initiator, the procedure directly continues with step S808 where the report timeout parameter is checked for each of the recorded messages in the broadcast transaction table. If the expiring time is valid and once it is expired, the broadcast listening table is searched for the same broadcast message, and all the children who have received the message will be flagged to form a report message (step S809). If the newly formed report is the same as the previous one (if there is any in a periodical report), the new report will be dropped. If the timeout is determined in step S808 it is additionally checked in step S810 if any of the devices in the table of neighboring devices has not relayed the newly broadcasted message. If so, the procedure branches to step S811 and the device retransmits the message few times.

Thereafter, the procedure continues with step S812, where it is checked if the received broadcast message is new in the broadcast transaction table. If so, it is checked in step S813 if the value of the radius parameter is larger than zero. If so, the new message will be processed and retransmitted in step S815 after the radius has been reduced by 1 in the retransmitted broadcast message in the previous step S814. If the value of the radius parameter is 1 and there is no report to be generated in this device (e.g., no periodical report or timeout report requested), this device may generate a status report immediately if there is any valid children devices in the broadcast listening table. This ensures that at the very last of the broadcast wave, the status report can be generated even if the initiator neither asks for a periodical report nor for a timeout report.

Now, it is checked in step S816 if the device has no child device or if all the received messages are having the radius one. If so, there is no need for the device to generate a report message and the procedure branches to step S826. Otherwise, the procedure continues with step S817, where it is checked if a report message is to be generated. If so, then the broadcast transaction table is searched for the message with the shortest radius parameter R, the sending address from that message is extracted, and then the report message is sent to that device with the address using a unicast transmission (step S818). In case the sending address is same as that of the report generating device, then the procedure directly continues with step S821.

In step S819 it is checked if the report message has failed in the unicast sending process. If so, the broadcast transaction table is searched again for a device with a larger radius than the current one and the report message is sent to that device in step S820. Which ensures if the device cannot receive the report, the report will send to the possible parent of that device.

In step S821 it is checked if a report message has been received. When it is determined in step S821 that the concerned device has received a report message, the procedure branches to step S822 and it is checked if there is child device with the same message. If so, the broadcast transaction table is searched for the shortest radius parameter R for this message, and the device address is extracted from the message in step S823 for the report forwarding. If no such message is detected in step S822 in the broadcast transaction table, this report will be discarded in step S824. If one or more child devices with the same message are detected in step S822, the address of these child devices will be inserted into the status report of FIG. 5, or replaced if the same device is already included in the report. If the report is full for a single message, then the report can be split in two or more report messages.

After finishing the above process, the report message is consolidated and sent towards the initiator devices in step S825, since the reporting path is following the reverse order of the broadcasting path.

Then, the procedure continues with step S826 where it is checked if a new broadcast transmission is to be initiated. If so, the procedure continues with step S802 and initiates a new broadcast transmission. If not, the procedure branches to step S804 and checks for the receipt of a broadcast message.

In the following, calibration and re-calibration procedures for the radius parameter will be described based on second and third embodiments.

Figure 7:
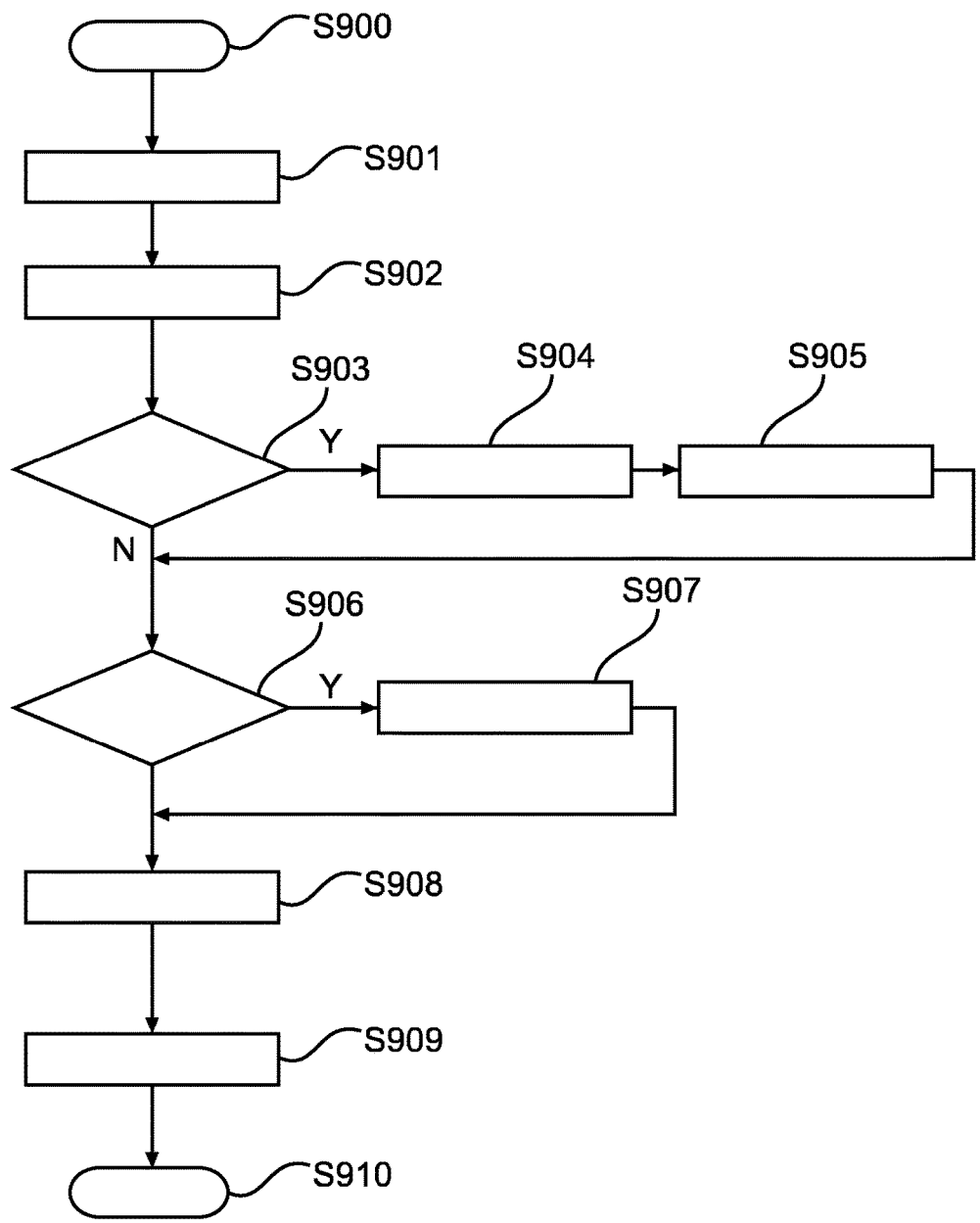
FIG. 7 shows a flow diagram of a broadcast radius calibration procedure according to a second embodiment.

FIG. 7 shows a flow diagram of a broadcast radius calibration procedure according to a second embodiment.

In step S900 the procedure starts and then, in step S901, all values of the radius parameter R in the broadcast transaction table are compared for all devices which have received the same broadcast message. In step S902, the largest one of the compared parameter values is picked out and inserted into the status report message. The above steps may be added behind at least of steps S806 and S808 of the above broadcast status reporting procedure of FIG. 6.

Then, it is checked in step S903 if any new device has been added into the status report. If so, the radius parameter R will be compared in step S904 against the radius parameter of the new device(s) and the larger one will be kept in the report (step S905).

In step S906 it is checked if the status report has to be split into two or more reports. If so, the same radius parameter will be added to the new status reports (step S907). The above steps S903 to S907 may be added after step S821 of the above broadcast status reporting procedure of FIG. 6.

In step S908, when the broadcast initiator receives the status report messages, the reported radius parameters R will be extracted and compared. Then, in step S909, the largest value is selected as used as calibration result. Then, the procedure ends in step S910.

Once there is a calibration result, the next time broadcast command can use that value for the radius parameter to thereby limit the maximum number of devices a broadcast message can travel to. If the determined calibration value is smaller than the default value, the packet storm will be shorter.

Figure 8:
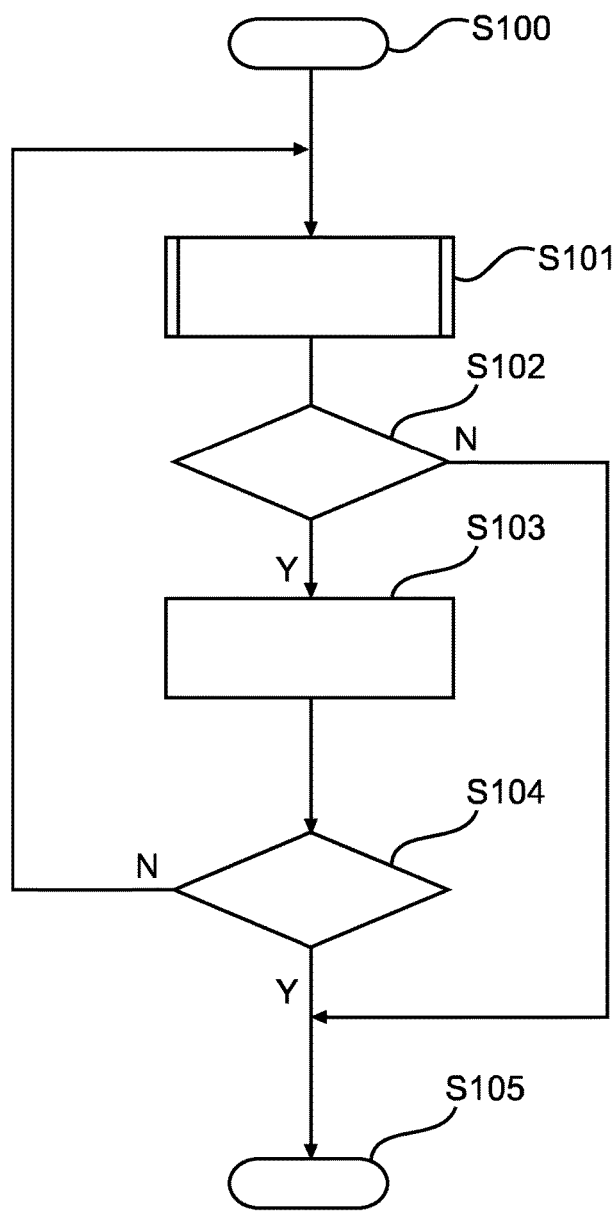
FIG. 8 shows a flow diagram of a broadcast radius re-calibration procedure according to a third embodiment.

FIG. 8 shows a flow diagram of a broadcast radius re-calibration procedure according to a third embodiment.

The broadcast initiator can use the above status reporting procedure, described in connection with FIG. 6. In step S100, the procedure starts and the above status reporting procedure of FIG. 6 may follow as a subroutine (step S101). Then, it is checked in step S102 if any device is not able to receive a broadcast message or the number of devices not receiving the broadcast message becomes worse. If so, a re-calibration is needed and the procedure continues with step S103. If not, the procedure ends in step S105.

In step S103, an initial value for the radius parameter is chosen. This value may be larger than the current radius and smaller than a default value, e.g., (current radius+default radius)/2, so that the re-calibration takes shorter time to complete. Then, it is checked in step S104, based on reported broadcast statuses, whether usage of the new calibration result satisfies predetermined criteria, e.g., all device are receiving the broadcast transmission, or the rate of failure is same as the previous one. If so, the re-calibration procedure ends in step S105. Otherwise, the procedure returns to step S101 and continues until the calibration result is accepted.

To summarize, a broadcast transmission will generate a packet storm in a mesh network, which will last for a very long time and block the network for other traffic. There is a parameter in a broadcast control mechanism named radius which controls the duration of the packet storm. The invention proposes to dynamically select the smallest radius parameter to reduce the packet storm to a minimum, by reporting the smallest possible radius parameter for the broadcast control mechanism.

While the invention has been illustrated and described in detail in the drawings and foregoing description, such illustration and description are to be considered illustrative or exemplary and not restrictive. The invention is not limited to the disclosed embodiments. The proposed processing can be applied to any kind of message-based information to be propagated in multi-hop or mesh networks for large scale wireless intelligent lighting applications for recovering failures in broadcast control. The control mechanisms describe above can be used in any wireless mesh network with many devices to receive broadcast messages.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 6 to 8 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A system for controlling information broadcast in a wireless mesh network, the network comprising a plurality of wirelessly interconnected devices, the system comprising:
   a device table comprised in each of the devices, for tracking which device has successfully relayed a broadcast transmission;
   a broadcast table comprised in each of the devices, for keeping a record of any new broadcast transmission that has been initiated by a device of the plurality of wirelessly interconnected devices or received from a neighboring device of the plurality of wirelessly interconnected devices;
   wherein each broadcast transmission includes a radius parameter R, which indicates an allowed number of hops through said mesh network before the broadcast transmission is discarded;
   wherein the system is adapted to add to a new broadcast transmission a radius parameter R, or to reduce the radius parameter R, by one when a received broadcast transmission is forwarded;
   wherein the system is adapted to check information provided in the device table and the broadcast table so as to report to a device of the plurality of wirelessly interconnected devices initiating a message, a maximum repetition number, Rmax, representative of the number of hops which was necessary to transmit the message to each device of the plurality of wirelessly interconnected devices, wherein the maximum repetition number Rmax is determined by the system using a broadcast storm as a number of repetitions necessary to reach every device in the network;
   wherein the device table includes a neighbor table for tracking which neighboring device, which is a device within a transmission or reception range of the device, has successfully relayed a broadcast transmission;
   and wherein the at least one broadcast table includes a broadcast transaction table for keeping a record of any new broadcast transmission that has been initiated by the associated device or received from a neighboring device;
   wherein the at least one device table includes,
   a child table for tracking which child device, which is a device to which said device has transmitted a broadcast transmission, has successfully relayed the broadcast transmission;
   and wherein the at least one broadcast table includes a broadcast listening table for keeping a record of any new broadcast transmission that has been received by a child device.

2. The system of claim 1, wherein the system is adapted to compare the radius parameter R, of a new broadcast transmission with a previous one when updating an existing entry in the broadcast transaction table and to record the smaller one in the broadcast transaction table.

3. The system of claim 1, wherein the system is adapted to check a report interval RPT-int, provided for each recorded broadcast message of the broadcast transaction table, to search for the same broadcast message in the broadcast listening table when the report interval has been reached, and to flag all child devices having received the same broadcast message so as to form a status report message, which status report message comprising a maximum repetition number value for said broadcast message received by each of said flagged child devices.

4. The system of claim 3, wherein the system is adapted to compare all values of the radius parameter R, in the broadcast table for all devices having received the same broadcast message and to insert the largest repetition number in a status report message.

5. The system of claim 1, wherein the system is adapted to check a report timeout RPT-to, provided for each recorded broadcast message of the broadcast transaction table, to search for the same broadcast message in the broadcast listening table when the report timeout has expired, and to flag all child devices having received the same broadcast message so as to form a status report message, which status report message comprising a maximum repetition number value for said broadcast message received by each of said flagged child devices.

6. The system of claim 1, wherein the device initiating a new message is adapted to retransmit a new broadcast transmission if after a timeout any of the devices listed in the device table has not relayed the new broadcast transmission.

7. The system of claim 1, wherein, if a status report message has been received by said system, the system is adapted to:
   search for the same message with the shortest radius parameter R, in the broadcast transaction table if there is a child device having the same message and
   extract a device address of the message with the shortest radius parameter, or to discard the status report message if there is no such message in the broadcast transaction table.

8. The system of claim 1 said system being adapted to:
   extract from at least one received status report message a maximum repetition number which indicates the number of hops necessary to reach a device, and
   select the largest value of extracted maximum repetition numbers as a calibration value to generate a radius parameter to be inserted into a broadcast transmission, said radius parameter being indicative of an allowed number of hops through said mesh network before the broadcast transmission is discarded.

9. The system of claim 8, wherein the system is adapted to initiate a re-calibration if it determines that a device of the wireless mesh network is not able to receive a broadcast transmission or that the number of devices not able to receive the broadcast transmission decreases, and wherein the system is adapted to start re-calibration by selecting an initial value for the radius parameter that is larger than a current value and smaller than a default value.

10. A system for controlling information broadcast in a wireless mesh network, the network comprising a plurality of wirelessly interconnected devices, the system comprising:
 a device table comprised in each of the devices, for tracking which device has successfully relayed a broadcast transmission;
 a broadcast table comprised in each of the devices, for keeping a record of any new broadcast transmission that has been initiated by a device of the plurality of wirelessly interconnected devices or received from a neighboring device of the plurality of wirelessly interconnected devices;
 wherein each broadcast transmission includes a radius parameter R, which indicates an allowed number of hops through said mesh network before the broadcast transmission is discarded;
 wherein the system is adapted to add to a new broadcast transmission a radius parameter R, or to reduce the radius parameter R, by one when a received broadcast transmission is forwarded; and
 wherein the system is adapted to check information provided in the device table and the broadcast table so as to report to a device of the plurality of wirelessly interconnected devices initiating a new message, a maximum repetition number, Rmax, representative of the number of hops which was necessary to transmit the message to each device of the plurality of wirelessly interconnected devices, wherein the maximum repetition number Rmax is determined by the system using a broadcast storm as a number of repetitions necessary to reach every device in the network; and
 wherein the system is adapted to:
  search for a message with the shortest radius parameter R, in the broadcast table if a status report message is generated,
  extract a sending address of the message with the shortest radius parameter, and
  send the status report message to the extracted sending address using a unicast transmission.

11. A method of controlling information broadcast in a wireless mesh network, the method comprising:
 tracking which device has successfully relayed a broadcast transmission with at least one device table;
 recording any new broadcast transmission that has been initiated by a device initiating a message or received from a neighboring device with at least one broadcast table; and
 adding to a new broadcast transmission a radius parameter R, which indicates an allowed number of hops through said mesh network before the broadcast transmission is discarded, or reducing the radius parameter R, by one when a received broadcast transmission is forwarded, wherein each broadcast transmission includes the radius parameter R;
 checking the recorded broadcast transmissions;
 determining a maximum repetition number, Rmax, using a broadcast storm, wherein Rmax is representative of the number of hops which is necessary to transmit the messages in the broadcast storm to each device of a plurality of wirelessly interconnected devices,
 determining and reporting to a device initiating a message, the maximum repetition number Rmax, and
 wherein the device table includes a neighbor table for tracking which neighboring device, which is a device within a transmission or reception range of the device, has successfully relayed a broadcast transmission;
 and wherein the at least one broadcast table includes a broadcast transaction table for keeping a record of any new broadcast transmission that has been initiated by the associated device or received from a neighboring device;
 wherein the at least one device table includes,
 a child table for tracking which child device, which is a device to which said device has transmitted a broadcast transmission, has successfully relayed the broadcast transmission;
 and wherein the at least one broadcast table includes a broadcast listening table for keeping a record of any new broadcast transmission that has been received by a child device.

12. The method of claim 11 further comprising:
 at a device initiating a new message:
 receiving said reporting of maximum repetition number Rmax,
 extracting from said reporting the maximum repetition number Rmax, and
 selecting the largest value of extracted maximum repetition numbers as a calibration value to generate a radius parameter to be inserted into a broadcast transmission, said radius parameter being indicative of an allowed number of hops through said mesh network before the broadcast transmission is discarded.

* * * * *